(12) United States Patent
Kato

(10) Patent No.: US 10,468,870 B2
(45) Date of Patent: *Nov. 5, 2019

(54) ELECTROSTATIC PROTECTION CIRCUIT

(71) Applicant: KABUSHIKI KAISHA TOSHIBA, Tokyo (JP)

(72) Inventor: Kazuhiro Kato, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,424

(22) Filed: Jun. 22, 2018

(65) Prior Publication Data

US 2018/0301889 A1    Oct. 18, 2018

Related U.S. Application Data

(63) Continuation of application No. 15/019,645, filed on Feb. 9, 2016, now Pat. No. 10,033,177.

(30) Foreign Application Priority Data

Mar. 2, 2015   (JP) .................................. 2015-040252

(51) Int. Cl.
*H02H 9/02* (2006.01)
*H02H 3/20* (2006.01)
*H02H 9/04* (2006.01)
*H02H 7/00* (2006.01)

(52) U.S. Cl.
CPC ............. *H02H 3/20* (2013.01); *H02H 9/041* (2013.01); *H02H 9/042* (2013.01); *H02H 7/008* (2013.01)

(58) Field of Classification Search
USPC ............................................ 361/56
See application file for complete search history.

(56) References Cited

U.S. PATENT DOCUMENTS

| 8,519,432 | B2 | 8/2013 | Barrow et al. |
| 9,148,015 | B2 | 9/2015 | Kato et al. |
| 9,728,512 | B2 | 8/2017 | Russ |
| 10,033,177 | B2 * | 7/2018 | Kato ........................ H02H 3/20 |
| 10,069,297 | B2 * | 9/2018 | Haruki ................... H02H 9/046 |
| 2005/0275984 | A1 * | 12/2005 | Liu ...................... H01L 27/0262 |
| | | | 361/56 |
| 2007/0247772 | A1 | 10/2007 | Keppens et al. |

(Continued)

FOREIGN PATENT DOCUMENTS

| JP | H08321756 A | 12/1996 |
| JP | 2008235886 A | 10/2008 |

(Continued)

*Primary Examiner* — Ronald W Leja

(74) *Attorney, Agent, or Firm* — Kim & Stewart LLP

(57) ABSTRACT

An electrostatic protection circuit includes a trigger circuit that is connected between a first power line and a second power line. The trigger circuit is configured to output a trigger signal in response to a voltage fluctuation between the first and second power lines. A shunt element has a main current path between the first power line and the second power line and is controllable to be on and off using the trigger signal. A control circuit is configured to supply a control signal to turn off the shunt element when a current value of the main current path of the shunt element exceeds a predetermined threshold value.

16 Claims, 3 Drawing Sheets

(56) References Cited

U.S. PATENT DOCUMENTS

| | | |
|---|---|---|
| 2007/0285854 A1 | 12/2007 | Rodgers et al. |
| 2008/0062597 A1* | 3/2008 | Chen .................. H01L 27/0251 |
| | | 361/56 |
| 2008/0218920 A1 | 9/2008 | Vanysacker et al. |
| 2008/0239599 A1* | 10/2008 | Yizraeli ................ H02H 9/046 |
| | | 361/56 |
| 2010/0214706 A1 | 8/2010 | Crespo et al. |
| 2013/0027820 A1 | 1/2013 | Padilla et al. |
| 2014/0160604 A1 | 6/2014 | Lai et al. |
| 2014/0268441 A1 | 9/2014 | Mallikarjunaswamy |
| 2014/0368957 A1* | 12/2014 | Kato ...................... H02H 9/041 |
| | | 361/56 |
| 2014/0368958 A1 | 12/2014 | Ikimura |
| 2016/0020603 A1 | 1/2016 | Parthasarathy et al. |
| 2016/0261105 A1 | 9/2016 | Kato |

FOREIGN PATENT DOCUMENTS

| | | |
|---|---|---|
| JP | 2009534845 A | 9/2009 |
| JP | 2014086580 A | 5/2014 |

* cited by examiner

ELECTROSTATIC PROTECTION CIRCUIT

CROSS-REFERENCE TO RELATED APPLICATIONS

This application is a continuation of U.S. patent application Ser. No. 15/019,645, filed on Feb. 9, 2016, which is based upon and claims the benefit of priority from Japanese Patent Application No. 2015-040252, filed Mar. 2, 2015, the entire contents of each of which are incorporated herein by reference.

FIELD

Embodiments described herein relate generally to an electrostatic protection circuit.

BACKGROUND

Various proposals for a protection circuit against Electrostatic Discharge (ESD) have been made heretofore. ESD means a discharge from an electrically charged body or machine to a semiconductor device and a discharge from an electrically charged semiconductor device to the ground potential. When an ESD occurs in a semiconductor device, a large amount of electric charge from the terminal flows into the semiconductor device as a current and the electric charge generates a high voltage inside the semiconductor device, hence causing, for example, a dielectric breakdown of the internal elements and subsequently a fault in the semiconductor device.

A representative example of the electrostatic protection circuit is an RC triggered (RCT) MOS circuit. This RCT MOS circuit uses a trigger circuit formed by a serial circuit including a resistor and a capacitor serially connected between power terminals. A voltage at the connection point between the resistor and the capacitor is set as a trigger signal for driving a shunt transistor for discharging the electrostatic surge. Since the on time of the shunt transistor is determined by a time constant of the trigger circuit, the time constant used in the trigger circuit has to be large enough to allow discharge of the ESD surge completely. However, when a large current keeps flowing through the shunt transistor for a long time, there is concern that the shunt transistor itself may overheat and be damaged.

DETAILED DESCRIPTION

According to an example embodiment, an electrostatic protection circuit that is capable of fully discharging an ESD surge and protecting the shunt element from damage due to burnout is provided.

In general, according to one embodiment, an electrostatic protection circuit includes a trigger circuit that is connected between a first power line and a second power line. The trigger circuit is configured to output a trigger signal in response to a voltage fluctuation on the first and second power lines. A shunt element is connected between the first power line and the second power line and is configured to be controlled on and off according to the trigger signal. A control circuit is configured to supply a control signal when a current level of the main current path of the shunt element exceeds a predetermined threshold value, the control circuit causing the shunt element to turn off when the current level exceeds the predetermined threshold.

An electrostatic protection circuit according to specific example embodiments will be hereinafter described with reference to the drawings. The present disclosure is not limited to these examples embodiments.

First Embodiment

Figure 1:
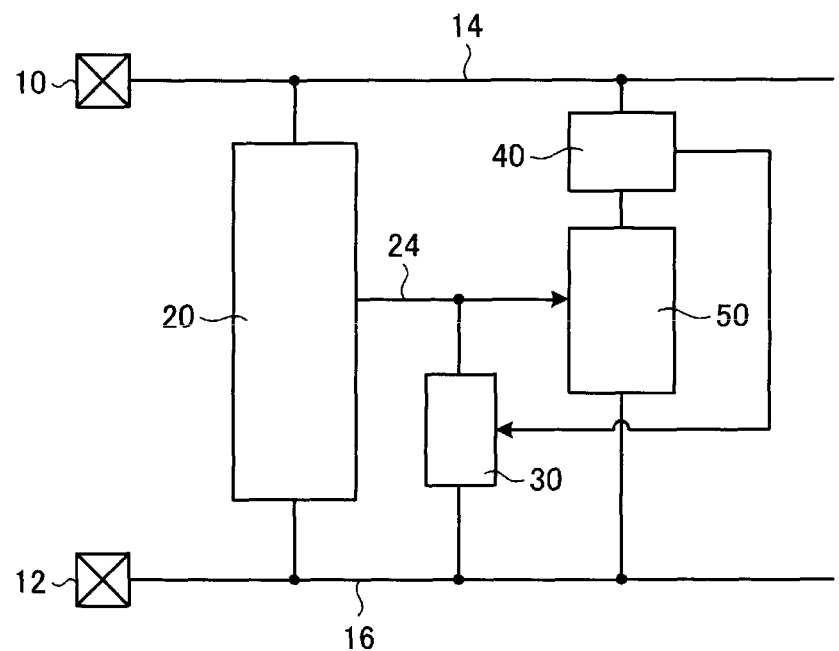
FIG. 1 is a view illustrating an electrostatic protection circuit according to a first embodiment.

FIG. 1 is a view illustrating an electrostatic protection circuit according to a first embodiment. The electrostatic protection circuit according to the first embodiment includes a first power line 14 connected to a first power terminal 10. For example, a power voltage VCC of a high potential side is applied to the first power terminal 10 in a normal operation mode. The electrostatic protection circuit according to the first embodiment includes a second power line 16 connected to a second power terminal 12. For example, a ground potential VSS of a low potential side is applied to the second power terminal 12 in a normal operation mode. In general, an internal circuit to be biased by a voltage between the first power line 14 and the second power line 16 would also be connected to the first power terminal 10 and the second power terminal 12; however the internal circuit is not specifically depicted in FIG. 1.

The electrostatic protection circuit according to the first embodiment includes a trigger circuit 20 connected between the first power line 14 and the second power line 16. In response to a voltage difference between the first power line 14 and the second power line 16, the trigger circuit 20 outputs a trigger signal.

The electrostatic protection circuit according to the first embodiment includes a shunt circuit 50 connected between the first power line 14 and the second power line 16. The shunt circuit 50 includes a shunt element (not specifically illustrated) formed by, for example, a MOS transistor with a source-drain path (main current pathway), connected between the first power line 14 and the second power line 16. A trigger signal is supplied to the shunt circuit 50 from the trigger circuit 20 through a signal line 24.

The electrostatic protection circuit according to the first embodiment includes an overcurrent detection circuit 40 connected in series with the shunt circuit 50 between the first power line 14 and the second power line 16. The overcurrent detection circuit 40 detects a current flowing in the shunt circuit 50, and when this current exceeds a predetermined threshold value, the circuit 40 outputs a control signal.

The electrostatic protection circuit according to the first embodiment includes a switch circuit 30. The switch circuit 30 acts to turn off the shunt circuit 50 in response to the control signal (indicating current in shunt circuit 50 exceeds the threshold value) from the overcurrent detection circuit 40.

In the electrostatic protection circuit according to the first embodiment, when a current flowing in the shunt circuit 50 exceeds a predetermined current value, the overcurrent detection circuit 40, in response to this, operates the switch circuit 30 so as to turn off the shunt circuit 50. By this operation, the shunt circuit 50 may be protected from the damage due to overcurrent. The value of the current to which the overcurrent detection circuit 40 responds may be set at any value in consideration of the allowable current value for a shunt element of the shunt circuit 50. For example, the peak current defined by an ESD protection standard may be set as the threshold value. Specifically, when the overcurrent detection circuit 40 detects that the current flowing in the shunt circuit 50 exceeds the peak current as such is defined by an ESD protection standard, the overcurrent detection circuit 40 turns off the shunt circuit 50. For example, in the Human Body Model (HBM method) ESD test standard, the peak current is set at 1.33 A (ampere).

Second Embodiment

Figure 2:
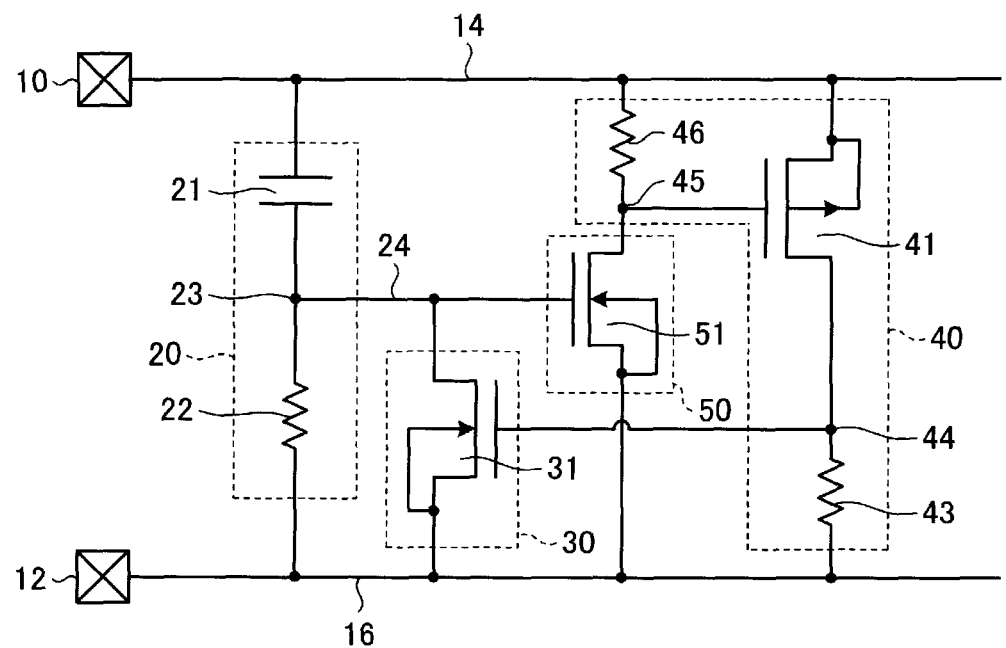
FIG. 2 is a view illustrating an electrostatic protection circuit according to a second embodiment.

FIG. 2 is a view illustrating an electrostatic protection circuit according to a second embodiment. The electrostatic protection circuit according to the second embodiment includes the trigger circuit 20 connected between the first power line 14 and the second power line 16. The trigger circuit 20 includes a serial circuit of a capacitor 21 and a resistor 22. A common connection node 23 of the capacitor 21 and the resistor 22 forms an output end of the trigger circuit 20.

For example, the time constant of a CR circuit formed by the capacitor 21 and the resistor 22 forming the trigger circuit 20 is set at a value satisfying an ESD test standard. In the ESD Human Body Model test standard, such a test is performed such that a 100 pF (picofarad) capacitor is discharged through a resistor of 1.5 kΩ (kilo-ohm). Therefore, the time constant of the trigger circuit 20 is set, for example, at 1 μS (microsecond) which is a value between six and seven times 150 nS (nanoseconds), corresponding to the time constant of 150 nS (nanosecond) for the capacitor of 100 pF and the resistor of 1.5 kΩ used in the ESD test standard. The time constant of the trigger circuit is set to a value allowing for discharging the ESD surge completely. For example, with the value of the capacitor 21 set at 1 pF and the value of the resistor 22 set at 1 MΩ, the time constant is set at 1 μS.

The common connection node 23 of the trigger circuit 20 is connected through the signal line 24 to the gate of an NMOS transistor 51 in shunt circuit 50. The source of the NMOS transistor 51 is connected to the second power line 16. The drain of the NMOS transistor 51 is connected to the first power line 14 through a resistor 46. According to this, the source-drain path (main current pathway) of the NMOS transistor 51 is connected between the first power line 14 and the second power line 16.

A connection node 45 of the resistor 46 and the drain of the NMOS transistor 51 is connected to the gate of a PMOS transistor 41. The source of the PMOS transistor 41 is connected to the first power line 14, and the drain is connected to the second power line 16 through a resistor 43.

A connection node 44 of the drain of the PMOS transistor 41 and the resistor 43 is connected to the gate of an NMOS transistor 31. The source of the NMOS transistor 31 is connected to the second power line 16, and the drain is connected to the gate of the NMOS transistor 51.

When a positive ESD surge with respect to the second power terminal 12 is applied to the first power terminal 10, a transient current flows in the trigger circuit 20. When a voltage drop generated across the resistor 22 due to this transient current exceeds a threshold voltage of the NMOS transistor 51, the NMOS transistor 51 is turned on. By turning on the NMOS transistor 51, a discharge path for the ESD surge is formed between the first power line 14 and the second power line 16.

When a voltage drop generated across the resistor 46 due to the current flowing in the source-drain path of the NMOS transistor 51 (drain current) after the NMOS transistor 51 has been turned on exceeds a threshold value of the PMOS transistor 41, the PMOS transistor 41 is turned on.

When a voltage drop generated across the resistor 43, due to the current flowing in the source-drain path of the PMOS transistor 41 (drain current) after the PMOS transistor 41 has been turned on, exceeds a threshold voltage of the NMOS transistor 31, the NMOS transistor 31 is turned on. When the NMOS transistor 31 is turned on, the potential of the gate of the NMOS transistor 51 is lowered and the NMOS transistor 51 is consequently turned off.

According to the second embodiment, when the drain current of the NMOS transistor 51 forming the shunt circuit 50 exceeds the predetermined threshold value, the NMOS transistor 51 will be turned off. In other words, it is possible to detect that the drain current of the NMOS transistor 51 exceeds the predetermined current value by use of the voltage drop across the resistor 46 corresponding to the drain current of the NMOS transistor 51. The PMOS transistor 41, with the gate-source voltage differential being set according to the voltage drop generated across the resistor 46. The PMOS transistor 41 is thus controlled on and off according to the voltage across the resistor 46.

When the PMOS transistor 41 is turned on, the NMOS transistor 31 is turned on connecting the gate of NMOS transistor 51 to second power line 16 (which is notionally at a low side or ground potential). Therefore, the NMOS transistor 51 forming the shunt circuit 50 can be turned off and the overcurrent flowing through the NMOS transistor will stop flowing, hence the NMOS transistor 51 is protected from the damage which might be caused by extended flowing of an overcurrent. Accordingly, even when the time constant of the trigger circuit 20 is set long enough to discharge the ESD surge completely, the NMOS transistor 51 may be protected from the damage caused by the overcurrent by operation of the NMOS transistor 31 in conjunction with overcurrent detection circuit 40.

The threshold value of the current for turning off the NMOS transistor 51 may be set at an arbitrary value, such as by considering the allowable and/or rated current value for the NMOS transistor 51. For example, the peak current as defined by an appropriate ESD standard (e.g., Human Body Model) may be set as the threshold value. Specifically, when current exceeding the peak current flows as the drain current of the NMOS transistor 51, the resistance value of the resistor 46 may be set so as to turn on the PMOS transistor 41 according to the voltage drop across the resistor 46.

Third Embodiment

Figure 3:
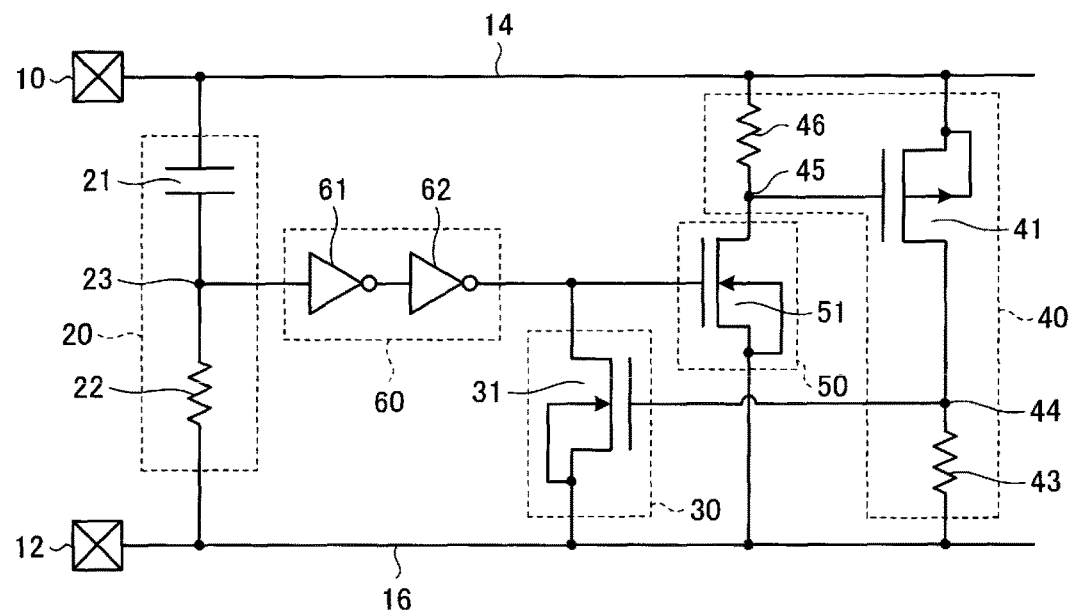
FIG. 3 is a view illustrating an electrostatic protection circuit according to a third embodiment.

FIG. 3 is a view illustrating an electrostatic protection circuit according to a third embodiment. In the electrostatic protection circuit according to the third embodiment, a buffer circuit 60 is connected between the common connection node 23 (between capacitor 21 and resistor 22) of the trigger circuit 20 and the gate of the NMOS transistor 51. The buffer circuit 60 as depicted in FIG. 3 includes two inverters 61, 62 (two inverter stages) connected in series. The inverters 61, 62 may be, for example, CMOS inverters. A trigger signal from the trigger circuit 20 is waveformshaped and amplified by the buffer circuit 60 and ultimately supplied to the gate of the NMOS transistor 51.

In the third embodiment, the trigger signal is supplied to the gate of the NMOS transistor 51 through the buffer circuit 60. By amplifying the trigger signal with the buffer circuit 60 and supplying this amplified trigger signal to the NMOS transistor 51 the driving capacity of the trigger signal is enhanced, and the current capacity of the NMOS transistor 51 may be increased. According to this, the discharge ability of the ESD surge may be enhanced.

Fourth Embodiment

Figure 4:
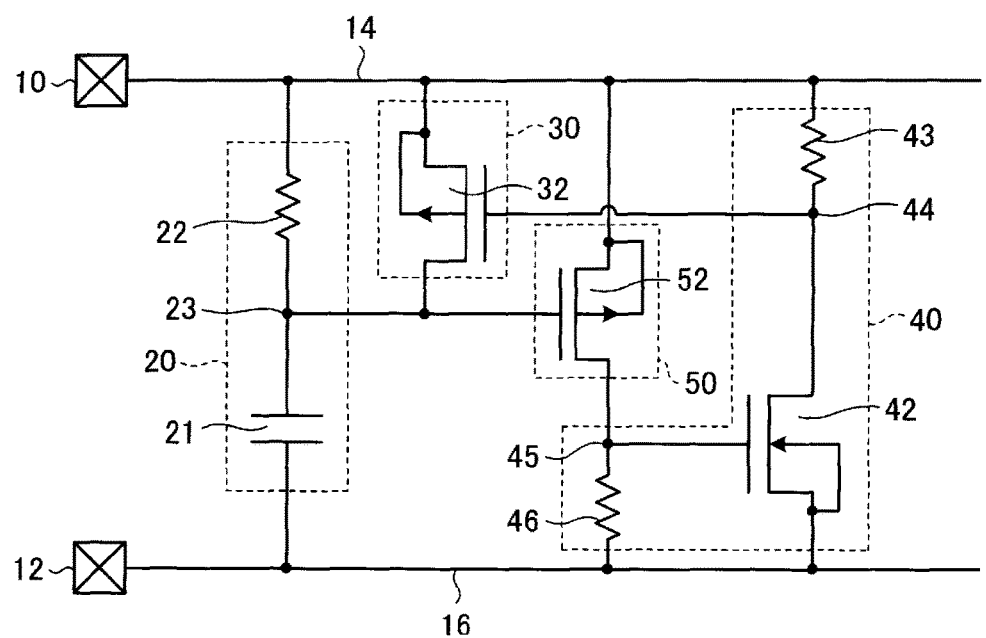
FIG. 4 is a view illustrating an electrostatic protection circuit according to a fourth embodiment.

FIG. 4 is a view illustrating an electrostatic protection circuit according to a fourth embodiment. The electrostatic protection circuit according to the fourth embodiment includes a PMOS transistor 52 in the shunt circuit 50. The source of the PMOS transistor 52 is connected to the first power line 14. The drain of the PMOS transistor 52 is connected to the second power line 16 through the resistor 46. According to this, the source-drain path (main current pathway) of the PMOS transistor 52 is connected between the first power line 14 and the second power line 16.

The connection node 45 between the resistor 46 and the drain of the PMOS transistor 52 is connected to the gate of an NMOS transistor 42. The source of the NMOS transistor 42 is connected to the second power line 16, and the drain is connected to the first power line 14 through the resistor 43.

The connection node 44 between the drain of the NMOS transistor 42 and the resistor 43 is connected to the gate of a PMOS transistor 32. The source of the PMOS transistor 32 is connected to the first power line 14, and the drain is connected to the gate of the PMOS transistor 52.

When a positive ESD surge with respect to the second power terminal 12 is applied to the first power terminal 10, a transient current flows in the trigger circuit 20. When a voltage drop across the resistor 22 generated by this transient current exceeds a threshold voltage of the PMOS transistor 52, the PMOS transistor 52 is turned on. By turning on the PMOS transistor 52, a discharge path for the ESD surge is formed between the first power line 14 and the second power line 16.

When a voltage drop generated across the resistor 46 by the current flowing in the source-drain path of the PMOS transistor (the drain current of the PMOS transistor 52), exceeds a threshold value of the NMOS transistor 42, the NMOS transistor 42 is turned on.

When a voltage drop generated across the resistor 43 by the current flowing in the source-drain path of the NMOS transistor (the drain current of the NMOS transistor 42), exceeds a threshold voltage of the PMOS transistor 32 in the switch circuit 30, the PMOS transistor 32 is turned on. When the PMOS transistor 32 is turned on, the potential of the gate of the PMOS transistor 52 is raised, causing the PMOS transistor 52 to turn off.

According to the fourth embodiment, when the drain current of the PMOS transistor 52 exceeds the predetermined threshold value, the PMOS transistor 52 may be controlled to be turned off. In other words, it is possible to detect that the drain current of the PMOS transistor 52 exceeds the predetermined current value by using the resistor 46, which generates a voltage drop depending on the drain current of the PMOS transistor 52. The NMOS transistor 42, with the gate-source voltage differential being set according to the voltage generated across the resistor 46. The NMOS transistor 42 thus is controlled to be turned on/off according to the voltage across the resistor 46.

By turning on the PMOS transistor 32 forming the switch circuit 30 when the NMOS transistor 42 is turned on, such a situation that an overcurrent keeps flowing in the PMOS transistor 52 forming the shunt circuit 50 may be avoided, hence the PMOS transistor 52 is protected from damage.

The threshold value of the current for turning off the PMOS transistor 52 may be set at an arbitrary value, considering the allowable current value for the PMOS transistor 52. For example, the peak current defined by an appropriate ESD standard (e.g., Human Body Model) may be set as the threshold value. Specifically, the peak current and the resistor value of the resistor 46 may be set so as to turn on the NMOS transistor 42 according to the voltage across the resistor 46.

Fifth Embodiment

Figure 5:
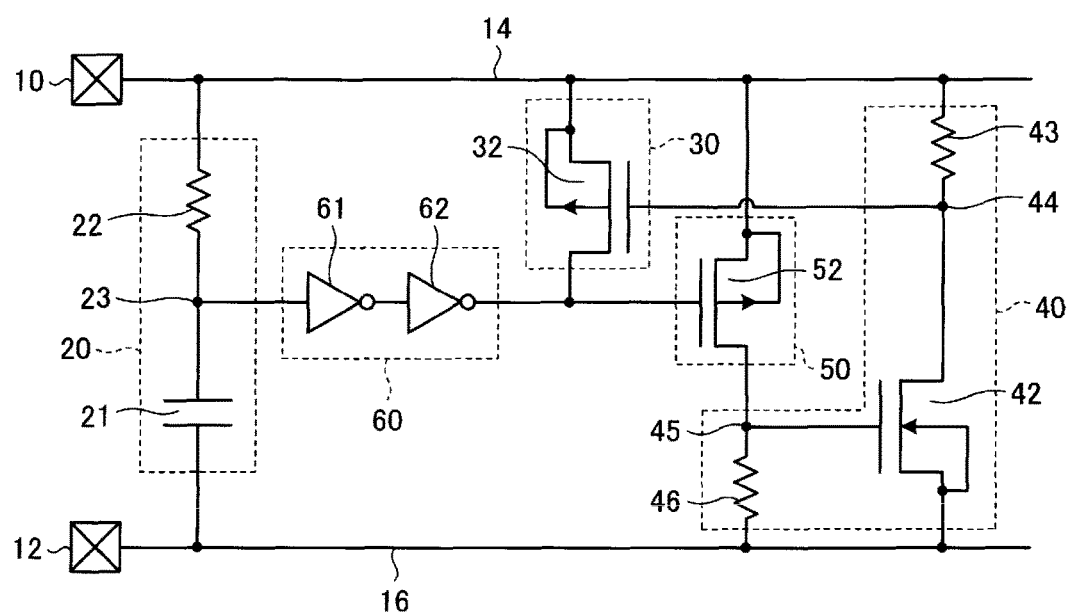
FIG. 5 is a view illustrating an electrostatic protection circuit according to a fifth embodiment.

FIG. 5 is a view illustrating an electrostatic protection circuit according to a fifth embodiment. In the electrostatic protection circuit according to the fifth embodiment, a trigger signal of the trigger circuit 20 is supplied to the gate of the PMOS transistor 52 through buffer circuit 60. The trigger signal of the trigger circuit 20 is amplified by the buffer circuit 60 and supplied to the PMOS transistor 52. The amplified trigger signal provided enhanced driving ability for operating the PMOS transistor. As the result, the current capacity of the PMOS transistor 52 may be increased. According to this, the discharge ability of the ESD surge may be enhanced.

As the shunt transistor, a double-diffused MOS (DMOS) transistor with a high withstand voltage may be used. Furthermore, a bipolar transistor may be used as the shunt transistor.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the disclosure.

What is claimed is:

1. An electrostatic protection circuit, comprising:
    a trigger circuit connected between a first power line and a second power line and configured to output a trigger signal in response to a voltage fluctuation on the first and second power lines;
    a shunt element connected between the first power line and the second power line and configured to be turned on and off according to the trigger signal; and
    a control circuit configured to supply a control signal causing the shunt element to turn off when a current level flowing through the shunt element exceeds a predetermined threshold value.

2. The electrostatic protection circuit according to claim 1, wherein the control circuit includes:
    a resistor connected in series with a main current path of the shunt element between the first and second power lines, and
    a transistor having a gate connected to a node between the resistor and the shunt element and a source connected to one of the first and second power lines.

3. The electrostatic protection circuit according to claim 1, further comprising:

a buffer circuit connected between the trigger circuit and the shunt element, wherein the trigger signal is supplied to the shunt element through the buffer circuit.

4. The electrostatic protection circuit according to claim 1, wherein the control circuit includes:

a first resistor connected in series with a main current path of the shunt element between the first and second power lines, and a first transistor having a gate connected to a connection node between the first resistor and the shunt element and a source connected to a one of the first and second power lines; and the control signal is supplied to a gate of a second transistor, the second transistor having a main current path connected between a control electrode of the shunt element and one of the first and second power lines, the control signal causing the second transistor to connect the control electrode to the one of the first and second power lines to cause the shunt element to turn off.

5. The electrostatic protection circuit according to claim 1, wherein the shunt element is a first n-channel transistor;
the control circuit includes:
a first resistor connected between the first power line and a drain of the first n-channel transistor, and
a p-channel transistor having a gate connected to a connection node between the shunt element and the first resistor, a source connected to the first power line, and a drain connected to a second resistor that is connected to the second power line; and
a node between the p-channel transistor and the second resistor is connected to a gate of a second n-channel transistor that has a drain connected to a gate of the first n-channel transistor and a source connected to the second power line.

6. The electrostatic protection circuit according to claim 5, further comprising:

a first inverter and a second inverter connected in series between the trigger circuit and the gate of the first n-channel transistor, wherein the trigger signal is supplied to the gate of the first n-channel transistor through the first and second inverters.

7. The electrostatic protection circuit according to claim 1, wherein the shunt element is a first p-channel transistor;
the control circuit includes:
a first resistor connected between the second power line and a drain of the first p-channel transistor, and
a n-channel transistor having a gate connected to a connection node between the shunt element and the first resistor, a source connected to the second power line, and a drain connected to a second resistor that is connected to the first power line; and
a node between the n-channel transistor and the second resistor is connected to a gate of a second p-channel transistor that has a drain connected to a gate of the first n-channel transistor and a source connected to the first power line.

8. The electrostatic protection circuit according to claim 7, further comprising:

a first inverter and a second inverter connected in series between the trigger circuit and the gate of the first p-channel transistor, wherein the trigger signal is supplied to the gate of the first p-channel transistor through the first and second inverters.

9. The electrostatic protection circuit according to claim 1, wherein the trigger circuit comprises a capacitor and a resistor connected in series between the first and second power lines.

10. The electrostatic protection circuit according to claim 9, wherein the capacitor is connected to the first power line and the resistor is connected to the second power line.

11. The electrostatic protection circuit according to claim 1, wherein the shunt element is a bipolar transistor.

12. The electrostatic protection circuit according to claim 1, wherein the shunt element is a double-diffused metal-oxide-semiconductor transistor.

13. An electrostatic protection circuit, comprising:

a trigger circuit including a capacitor and a first resistor connected in series between a first power line and a second power line;

a first transistor connected between the first power line and the second power line and connected to a connection node between the capacitor and the first resistor;

a second resistor connected in series with a current path of the first transistor between the first and second power lines;

a second transistor directly connected to a connection node between the second resistor and the first transistor and having a current path connected between the first and second power lines;

a third resistor connected in series with the current path of the second transistor between the first and second power lines; and a third transistor directly connected to a connection node between the third resistor and the second transistor having and a current path connected between the first transistor and one of the first and second power lines.

14. The electrostatic protection circuit according to claim 13, further comprising:

a buffer circuit connected between the first transistor and the connection node between the first resistor and the capacitor.

15. The electrostatic protection circuit according to claim 13, wherein the first transistor is a NMOS transistor,
the second transistor is a PMOS transistor,
the third transistor is a NMOS transistor.

16. The electrostatic protection circuit according to claim 13, wherein the first transistor is a PMOS transistor,
the second transistor is a NMOS transistor,
the third transistor is a PMOS transistor.

* * * * *